(12) United States Patent
Watanabe et al.

(10) Patent No.: US 11,108,062 B2
(45) Date of Patent: Aug. 31, 2021

(54) FUEL CELL SYSTEM AND METHOD OF CONTROLLING THE SAME

(71) Applicant: TOYOTA JIDOSHA KABUSHIKI KAISHA, Toyota (JP)

(72) Inventors: Satoshi Watanabe, Okazaki (JP); Norihiro Fukaya, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 274 days.

(21) Appl. No.: 16/288,423

(22) Filed: Feb. 28, 2019

(65) Prior Publication Data

US 2019/0280315 A1   Sep. 12, 2019

(30) Foreign Application Priority Data

Mar. 12, 2018  (JP) .............................. JP2018-043686

(51) Int. Cl.
*H01M 8/04089* (2016.01)
*H01M 8/0432* (2016.01)
*H01M 8/04746* (2016.01)
*H01M 8/0438* (2016.01)

(52) U.S. Cl.
CPC ..... *H01M 8/04089* (2013.01); *H01M 8/0432* (2013.01); *H01M 8/04395* (2013.01); *H01M 8/04753* (2013.01); *H01M 8/0438* (2013.01); *H01M 8/04335* (2013.01); *H01M 2250/20* (2013.01); *Y02E 60/50* (2013.01); *Y02T 90/40* (2013.01)

(58) Field of Classification Search
CPC ......... H01M 2250/20; H01M 8/04089; H01M 8/0432; H01M 8/04335; H01M 8/0438; H01M 8/04395; H01M 8/04753; Y02E 60/50; Y02T 90/40
See application file for complete search history.

(56) References Cited

U.S. PATENT DOCUMENTS

2005/0118467 A1   6/2005 Ojima et al.
2006/0127722 A1*  6/2006 Nakajima ......... H01M 8/04089
                                              429/444
(Continued)

FOREIGN PATENT DOCUMENTS

JP   2005-158647 A   6/2005
JP   2008-091257 A   4/2008
JP   2009-181793 A   8/2009
(Continued)

*Primary Examiner* — Lingwen R Zeng
(74) *Attorney, Agent, or Firm* — Dickinson Wright, PLLC

(57) ABSTRACT

A fuel cell system includes a control unit that is configured to perform pressure reduction control for increasing a flow rate of cathode gas supplied to a fuel cell from a turbo compressor, by controlling a pressure adjusting valve such that a pressure in the fuel cell is lower when a pressure reduction condition is fulfilled than when the pressure reduction condition is not fulfilled. The pressure reduction condition is a condition that an outside air pressure determined based on outside air pressure-associated information is lower than an outside air pressure threshold determined in advance and that an amount of water determined based on water amount-associated information is equal to or larger than a water amount threshold determined in advance.

7 Claims, 7 Drawing Sheets

(56) References Cited

U.S. PATENT DOCUMENTS

2009/0136791 A1* 5/2009 Ogawa ................ H01M 8/0432
429/431
2013/0157158 A1 6/2013 Kagami et al.

FOREIGN PATENT DOCUMENTS

| JP | 2014-011090 A | 1/2014 |
| WO | 2012/035974 A1 | 3/2012 |

* cited by examiner

FUEL CELL SYSTEM AND METHOD OF CONTROLLING THE SAME

INCORPORATION BY REFERENCE

The disclosure of Japanese Patent Application No. 2018-043686 filed on Mar. 12, 2018 including the specification, drawings and abstract is incorporated herein by reference in its entirety.

BACKGROUND

1. Technical Field

The disclosure relates to a fuel cell system and a method of controlling the fuel cell system.

2. Description of Related Art

In Japanese Patent Application Publication No. 2008-91257 (JP 2008-91257 A), there is disclosed a method of reducing the load of an air compressor by operating a fuel cell system on a highland, thereby raising the temperature of a fuel cell when the air compressor is overloaded, reducing the amount of water in the fuel cell, and reducing the amount of excessive air that is needed to drain the water produced in a cathode. In this method, the output of the fuel cell is enhanced by efficiently causing cathode gas to react in the fuel cell.

SUMMARY

In the art of Japanese Patent Application Publication No. 2008-91257 (JP 2008-91257 A), the interior of a fuel cell 10 may dry due to the raised temperature in the fuel cell 10. Therefore, the pressure in the fuel cell needs to be increased in order to restrain the interior thereof from drying. In the art of Japanese Patent Application Publication No. 2008-91257 (JP 2008-91257 A), the load of a Roots compressor can definitely be reduced even when the pressure in the fuel cell is increased, in the case where this compressor is employed as the air compressor.

However, the inventor of the present application has found out that the load of a turbo compressor may increase by contrast due to the increase in pressure in the fuel cell in the case where the turbo compressor is employed as the air compressor, and that there is a problem in that the output of the fuel cell cannot be sufficiently enhanced. Therefore, in the fuel cell system that is equipped with the turbo compressor, another art for enhancing the output of the fuel cell when the fuel cell system is operated on a highland has been desired.

The disclosure is realized in the following modes.

According to a first aspect of the disclosure, there is provided a fuel cell system. This fuel cell system includes a fuel cell that is configured to generate electric power through an electrochemical reaction between anode gas and cathode gas, a cathode gas supply flow passage that is configured to supply the cathode gas to the fuel cell, a cathode gas discharge flow passage that is configured to discharge the cathode gas from the fuel cell, a turbo compressor that is provided in the cathode gas supply flow passage, a pressure adjusting valve that is provided in the cathode gas discharge flow passage, an outside air pressure acquisition unit that is configured to acquire outside air pressure-associated information that is associated with an outside air pressure, a water amount acquisition unit that is configured to acquire water amount-associated information that is associated with an amount of water in the fuel cell, and a control unit that is configured to perform pressure reduction control for increasing a flow rate of the cathode gas supplied to the fuel cell from the turbo compressor, by controlling the pressure adjusting valve such that a pressure in the fuel cell is lower when a pressure reduction condition is fulfilled than when the pressure reduction condition is not fulfilled. The pressure reduction condition is a condition that the outside air pressure determined based on the outside air pressure-associated information is lower than an outside air pressure threshold determined in advance and that the amount of water determined based on the water amount-associated information is equal to or larger than a water amount threshold determined in advance. According to the fuel cell system in this aspect, the flow rate of the cathode gas delivered to the fuel cell can be increased by performing pressure reduction control when the fuel cell system is estimated to operate on a highland. Therefore, the output of the fuel cell can be enhanced.

In the fuel cell system of the first aspect, the control unit may be configured to reduce the pressure in the fuel cell as the outside air pressure falls in the pressure reduction control. According to the fuel cell system in this aspect, the flow rate of the cathode gas delivered to the fuel cell can be efficiently increased by performing the pressure reduction control.

The fuel cell system of the first aspect may include a temperature measurement unit that is configured to measure a temperature of the fuel cell. The control unit may be configured to refrain from performing the pressure reduction control when the temperature is equal to or higher than a temperature threshold determined in advance. According to the fuel cell system in this aspect, the interior of the fuel cell can be restrained from drying rapidly.

In the fuel cell system of the first aspect, the control unit may be configured to perform the pressure reduction control when the temperature is lower than the temperature threshold determined in advance.

The fuel cell system of the first aspect may include a first pressure measurement unit that is configured to measure the pressure in the fuel cell. The control unit may be configured to perform the pressure reduction control when the pressure is higher than a pressure upper limit value determined in advance.

According to a second aspect of the disclosure, there is provided a method of controlling a fuel cell system that includes a fuel cell that is configured to generate electric power through an electrochemical reaction between anode gas and cathode gas, a cathode gas supply flow passage that is configured to supply the cathode gas to the fuel cell, a cathode gas discharge flow passage that is configured to discharge the cathode gas from the fuel cell, a turbo compressor that is provided in the cathode gas supply flow passage, and a pressure adjusting valve that is provided in the cathode gas discharge flow passage. The method includes performing pressure reduction control for increasing a flow rate of the cathode gas supplied to the fuel cell from the turbo compressor, by controlling the pressure adjusting valve such that a pressure in the fuel cell is lower when a pressure reduction condition is fulfilled than when the pressure reduction condition is not fulfilled. The pressure reduction condition is a condition that an outside air pressure is lower than an outside air pressure threshold determined in advance and that an amount of water in the fuel cell is equal to or larger than a water amount threshold determined in advance.

The disclosure can be realized in various aspects. For example, the disclosure can be realized in aspects such as a method of controlling a fuel cell system, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
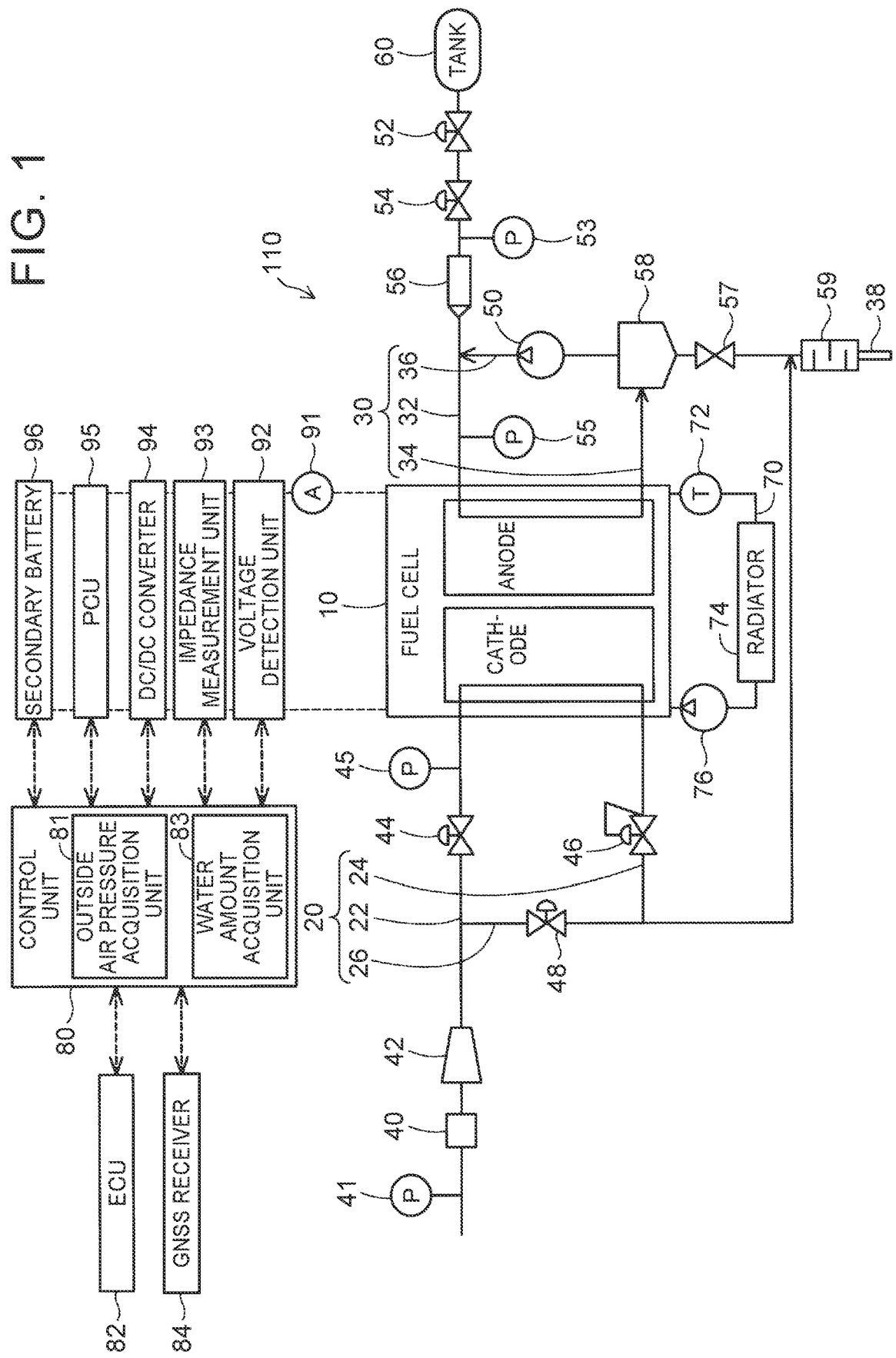
FIG. 1 is a schematic view showing the configuration of a fuel cell system as one of the embodiments of the disclosure.

FIG. 1 is a schematic view showing the configuration of a fuel cell system 110 as one of the embodiments of the disclosure. The fuel cell system 110 is equipped with a fuel cell stack (hereinafter referred to simply as "a fuel cell") 10, a cathode gas flow passage 20, an anode gas flow passage 30, a cooling flow passage 70, and a control unit 80. In the present embodiment, the fuel cell system 110 is mounted in a vehicle.

The fuel cell 10 is configured by, for example, stacking electric power generation modules each of which is equipped with a membrane electrode assembly (an MEA) obtained by joining both electrodes, namely, an anode and a cathode to both sides of an electrolytic membrane respectively. The fuel cell 10 generates electric power through an electrochemical reaction between hydrogen gas as anode gas supplied from an anode gas tank 60 and oxygen in the atmosphere as cathode gas. Incidentally, for example, alcohol or hydrocarbon may be used as anode gas instead of hydrogen gas.

The cathode gas flow passage 20 is a flow passage through which cathode gas is supplied to and discharged from the fuel cell 10. The cathode gas flow passage 20 is equipped with a cathode gas supply flow passage 22 through which cathode gas is supplied to the fuel cell 10, a cathode gas discharge flow passage 24 through which cathode gas is discharged from the fuel cell 10, and a bypass flow passage 26 that establishes communication between the cathode gas supply flow passage 22 and the cathode gas discharge flow passage 24.

The cathode gas supply flow passage 22 is provided, sequentially from an upstream side thereof, with an outside air pressure gauge 41, a flowmeter 40, a turbo compressor 42, a supply valve 44, and a pressure gauge 45. The outside air pressure gauge 41 is an instrument that measures an outside air pressure. The flowmeter 40 is an instrument that measures a flow rate of cathode gas introduced into the fuel cell system 110. The turbo compressor 42 is an instrument that compresses the introduced cathode gas and that delivers this cathode gas to the fuel cell 10. The supply valve 44 is a valve that controls the presence/absence of cathode gas flowing into the fuel cell 10 from the turbo compressor 42, and is provided in the cathode gas supply flow passage 22 downstream of a portion thereof that is connected to the bypass flow passage 26. The pressure gauge 45 is an instrument that measures a pressure at a cathode gas inlet of the fuel cell 10. In the present embodiment, the pressure gauge 45 measures a pressure at the cathode gas inlet of the fuel cell 10, but the disclosure is not limited thereto. For example, a pressure at a cathode gas outlet of the fuel cell 10 may be measured by providing the pressure gauge 45 in the cathode gas discharge flow passage 24.

A pressure adjusting valve 46 that adjusts the pressure of cathode gas on a cathode outlet side of the fuel cell 10 is provided in the cathode gas discharge flow passage 24 upstream of a portion thereof that is connected to the bypass flow passage 26. A bypass valve 48 that adjusts the flow rate of cathode gas in the bypass flow passage 26 is provided in the bypass flow passage 26. In the present embodiment, the bypass flow passage 26 is a flow passage that links a portion of the cathode gas supply flow passage 22 between the compressor 42 and the supply valve 44 with a portion of the cathode gas discharge flow passage 24 downstream of the pressure adjusting valve 46.

The anode gas flow passage 30 is a flow passage through which anode gas is supplied to and discharged from the fuel cell 10. The anode gas flow passage 30 is equipped with an anode gas supply flow passage 32 through which anode gas is supplied to the fuel cell 10, an anode gas discharge flow passage 34 through which anode gas is discharged from the fuel cell 10, and an anode gas circulation flow passage 36 that establishes communication between the anode gas supply flow passage 32 and the anode gas discharge flow passage 34.

The anode gas supply flow passage 32 is connected to the anode gas tank 60. The anode gas supply flow passage 32 is provided, sequentially from an upstream side thereof, with an open/close valve 52, a regulator 54, an upstream-side pressure measurement unit 53, an injector 56, and a pressure measurement unit 55. The open/close valve 52 is a valve that controls the presence/absence of anode gas flowing into the upstream side of the injector 56 from the anode gas tank 60. The regulator 54 is a valve for adjusting the pressure of anode gas upstream of the injector 56. The injector 56 is a valve that controls the inflow of anode gas into the fuel cell 10. In the present embodiment, the injector 56 is provided in the anode gas supply flow passage 32 upstream of a region thereof that communicates with the anode gas circulation flow passage 36. The upstream-side pressure measurement unit 53 is an instrument that measures a pressure at an inlet of the injector 56. The pressure measurement unit 55 is an instrument that measures a pressure at an anode gas inlet of the fuel cell 10. In the present embodiment, the pressure measurement unit 55 is provided in the anode gas supply flow passage 32 downstream of a portion thereof that is linked with the anode gas circulation flow passage 36.

The anode gas discharge flow passage 34 is connected to a gas-liquid separator 58. The anode gas discharge flow passage 34 guides unreacted gases (anode gas, nitrogen gas and the like) that have not been used for the electrochemical reaction in the fuel cell 10, and the water produced in the fuel cell 10 to the gas-liquid separator 58.

The gas-liquid separator 58 separates the gas and liquid discharged from the anode of the fuel cell 10 from each other. The gas-liquid separator 58 is connected to the anode gas circulation flow passage 36 and a discharge pipe 38. The gas-liquid separator 58 guides the unreacted anode gas that has not been used for the electrochemical reaction in the fuel cell 10 to the anode gas circulation flow passage 36, and guides the water and nitrogen gas produced in the fuel cell 10 to the discharge pipe 38.

A pump 50 is provided in the anode gas circulation flow passage 36. The pump 50 delivers the gases including the anode gas separated by the gas-liquid separator 58 to the anode gas supply flow passage 32. The fuel cell system 110 enhances the utilization efficiency of anode gas by circulating anode gas and supplying this anode gas again to the fuel cell 10.

The discharge pipe 38 is a pipeline for discharging the liquid and gas separated from each other by the gas-liquid separator 58 to the outside of the fuel cell system 110. The discharge pipe 38 is provided, sequentially from an upstream side thereof, with an exhaust drainage valve 57 that discharges gas and that drains water, and a silencer 59 that reduces the noise produced in discharging gas and draining water.

The cooling flow passage 70 is a flow passage that is provided to cool the fuel cell 10, and is a flow passage that links a radiator 74 for cooling a cooling medium in the cooling flow passage 70 with a cooling medium flow passage in the fuel cell 10. A temperature measurement unit 72 is provided in the cooling flow passage 70 upstream of the radiator 74. A pump 76 is provided in the cooling flow passage 70 downstream of the radiator 74. In the present embodiment, the temperature of the fuel cell 10 can be measured by the temperature measurement unit 72.

The DC/DC converter 94 steps up an output voltage of the fuel cell 10, supplies the stepped-up output voltage to a PCU 95, and is also connected to a secondary battery 96. The electric power generated by the fuel cell 10 is supplied to a load such as a drive motor for driving wheels, or the like, the above-mentioned turbo compressor 42, the above-mentioned pump 50, and various valves via an electric power supply circuit including the PCU 95. The PCU 95 limits the current of the fuel cell 10 through the control by the control unit 80. Incidentally, a current measurement unit 91 that measures a current of the fuel cell 10, and a voltage measurement unit 92 that measures a voltage of the fuel cell 10, and an impedance measurement unit 93 that measures an impedance of the fuel cell 10 are provided between the fuel cell 10 and the DC/DC converter 94. Besides, the control unit 80 is connected to a GNSS receiver 84 that receives GNSS information.

The control unit 80 is configured as a computer that is equipped with a CPU, a memory, and an interface circuit to which the above-mentioned respective components are connected. The control unit 80 outputs a signal for controlling the activation and stop of the components in the fuel cell system 110 in accordance with a command of an electronic control unit (an ECU) 82. The ECU 82 is a control unit that controls the entire vehicle including the fuel cell system 110. For example, the ECU 82 performs the control of the vehicle in accordance with a depression amount of an accelerator pedal, a depression amount of a brake pedal, a vehicle speed and the like. Incidentally, the ECU 82 may be included in part of the function of the control unit 80. The CPU performs the control of electric power generation by the fuel cell system 110, by executing a control program stored in the memory.

In the present embodiment, the control unit 80 performs pressure reduction control for increasing the flow rate of cathode gas supplied to the fuel cell 10 from the turbo compressor 42, by controlling the pressure adjusting valve 46 in such a manner as to reduce the pressure in the fuel cell 10, in comparison with a case where a pressure reduction condition determined in advance is not fulfilled, when the pressure reduction condition is fulfilled. This mechanism will be described hereinafter.

Figure 2:
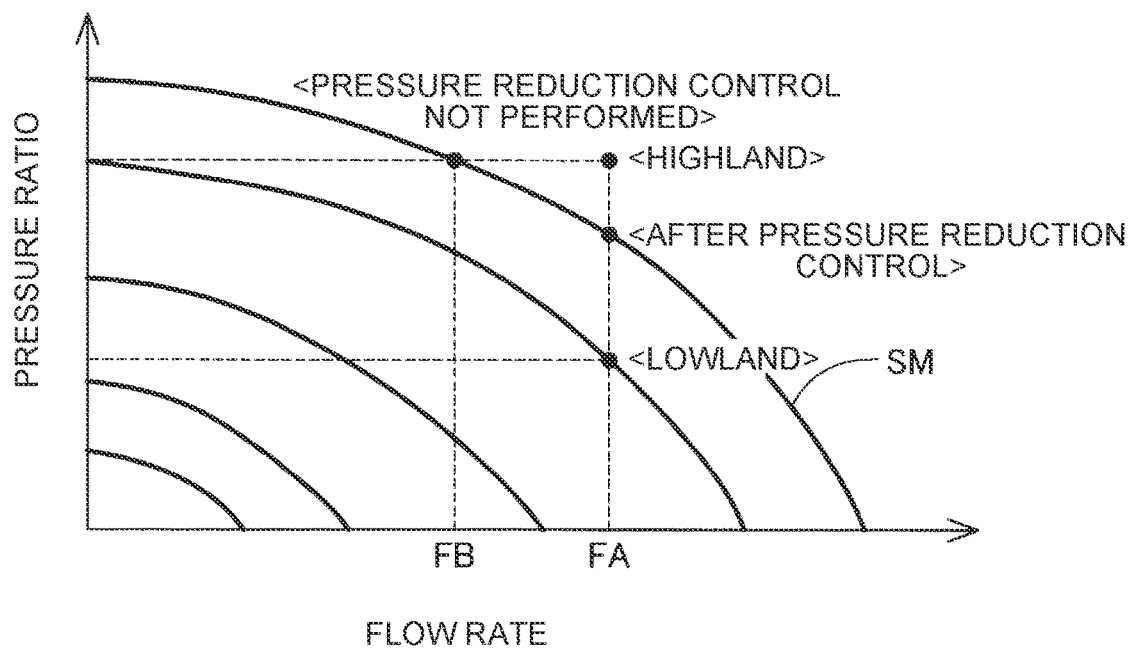
FIG. 2 is a view showing a relationship between the pressure ratio and the flow rate of cathode gas.

FIG. 2 is a view showing a relationship between the pressure ratio and the flow rate (NL/minute) of cathode gas supplied by the turbo compressor 42. The pressure ratio is a value obtained by dividing an outlet pressure of the turbo compressor 42 by an inlet pressure thereof. The inlet pressure can be regarded as being equal to an outside air pressure. Therefore, in the case where the outlet pressure of the turbo compressor 42 remains unchanged, the pressure ratio increases as the outside air pressure falls.

Each of a plurality of curves in FIG. 2 indicates a relationship between the pressure ratio and the flow rate of cathode gas at the time when the turbo compressor 42 is rotated at the same rotational speed. In the present embodiment, the turbo compressor 42 is employed as a compressor. Therefore, even when cathode gas is sent to the fuel cell 10 at the same rotational speed, the flow rate of cathode gas significantly differs depending on the pressure ratio. A curve SM indicates a relationship between the pressure ratio and the flow rate of cathode gas at the time when the rotational speed of the turbo compressor 42 is maximized.

It should be noted herein that the turbo compressor 42 is assumed to supply cathode gas at a flow rate FA with a view to satisfying an output required of the fuel cell 10 by the ECU 82. At this time, in the case where the fuel cell system 110 is on a lowland, the outside air pressure is higher and hence the pressure ratio is smaller than in the case where the fuel cell system 110 is on a highland. As a result, the control unit 80 can supply cathode gas to the fuel cell 10 at the flow rate FA, even when the rotational speed of the turbo compressor 42 is not maximized.

On the other hand, in the case where the fuel cell system 110 is on the highland, the outside air pressure is lower and hence the pressure ratio is larger than in the case where the fuel cell system 110 is on the lowland. As a result, in some cases, the flow rate FA of cathode gas is not obtained even when the rotational speed of the turbo compressor 42 is maximized. In such a case, the turbo compressor 42 can only supply cathode gas at up to a flow rate FB at the time when the rotational speed thereof is maximized.

In the present embodiment, however, the control unit 80 controls the pressure adjusting valve 46 in such a manner as to reduce the pressure in the fuel cell 10 when the pressure reduction condition determined in advance is fulfilled. When the pressure in the fuel cell 10 falls, the outlet pressure of the turbo compressor 42 falls, so the pressure ratio is smaller than in the case where the pressure reduction condition is not fulfilled. As a result, the flow rate of cathode gas supplied to the fuel cell 10 from the turbo compressor 42 can be increased while maintaining the rotational speed of the turbo compressor 42. Incidentally, in this example, with a view to facilitating the understanding of the contents, the rotational speed of the turbo compressor 42 is maximized. However, this mechanism is valid even when the rotational speed of the turbo compressor 42 is not maximized.

In the present embodiment, the control unit performs pressure reduction control when the pressure reduction condition that the outside air pressure is lower than an outside air pressure threshold determined in advance and that the amount of water in the fuel cell 10 is equal to or larger than a water amount threshold determined in advance is fulfilled. It is possible to mention that the amount of water in the fuel cell 10 decreases due to pressure reduction control, as a reason why pressure reduction control is performed when the amount of water in the fuel cell 10 is equal to or larger than the water amount threshold. A mechanism according to which the amount of water in the fuel cell 10 decreases due to pressure reduction control will be described hereinafter.

Figure 3:
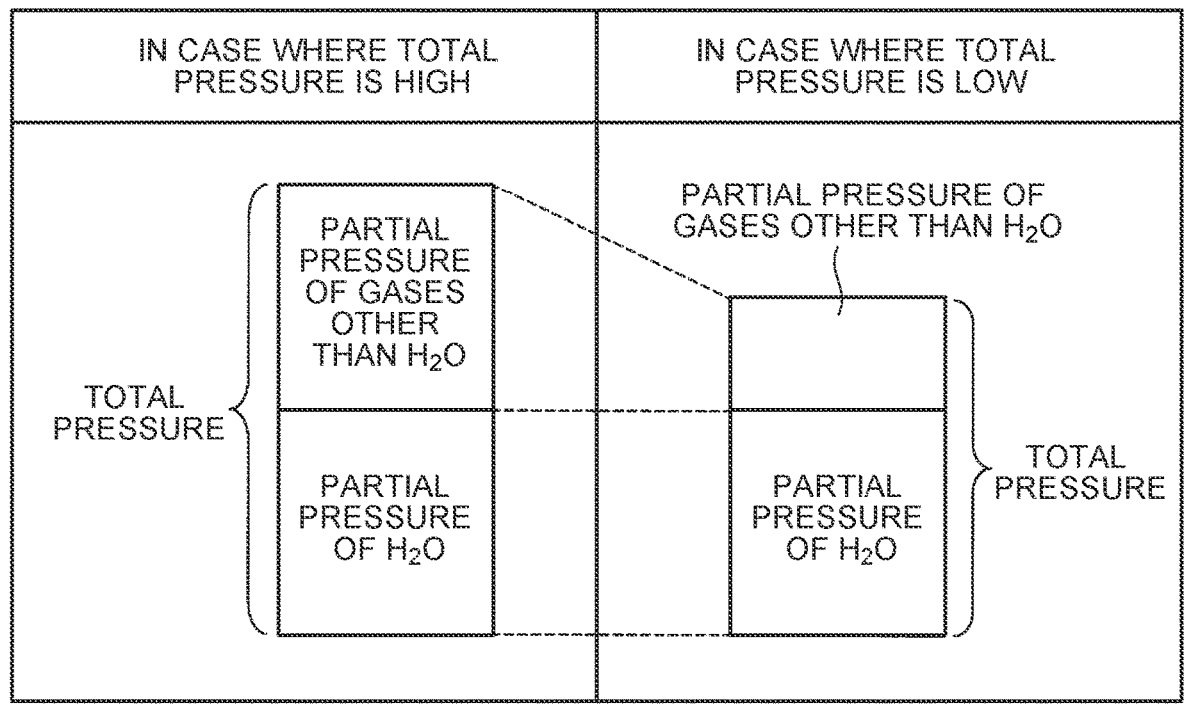
FIG. 3 is a view illustrating a relationship between the pressure in a fuel cell 10 and the amount of water.

FIG. 3 is a view showing a relationship between the pressure in the fuel cell 10 and the amount of water in the fuel cell 10. The water vapor pressure in the fuel cell 10 is constant regardless of the total pressure of gases in the fuel cell 10. Therefore, the ratio of the partial pressure of gases other than water vapor is larger when the total pressure in the fuel cell 10 is high than when the total pressure in the fuel cell 10 is low. As a result, in the case where the gases in the fuel cell 10 are discharged to the cathode gas discharge flow passage 24, the ratio of water vapor contained in the discharged gases is larger when the total pressure in the fuel cell 10 is low than when the total pressure in the fuel cell 10 is high. As a result, the amount of water in the fuel cell 10 decreases more when the total pressure in the fuel cell 10 is low than when the total pressure in the fuel cell 10 is high. In the present embodiment, therefore, the control unit 80 performs pressure reduction control when the amount of water in the fuel cell 10 is equal to or larger than the water amount threshold.

Figure 4:
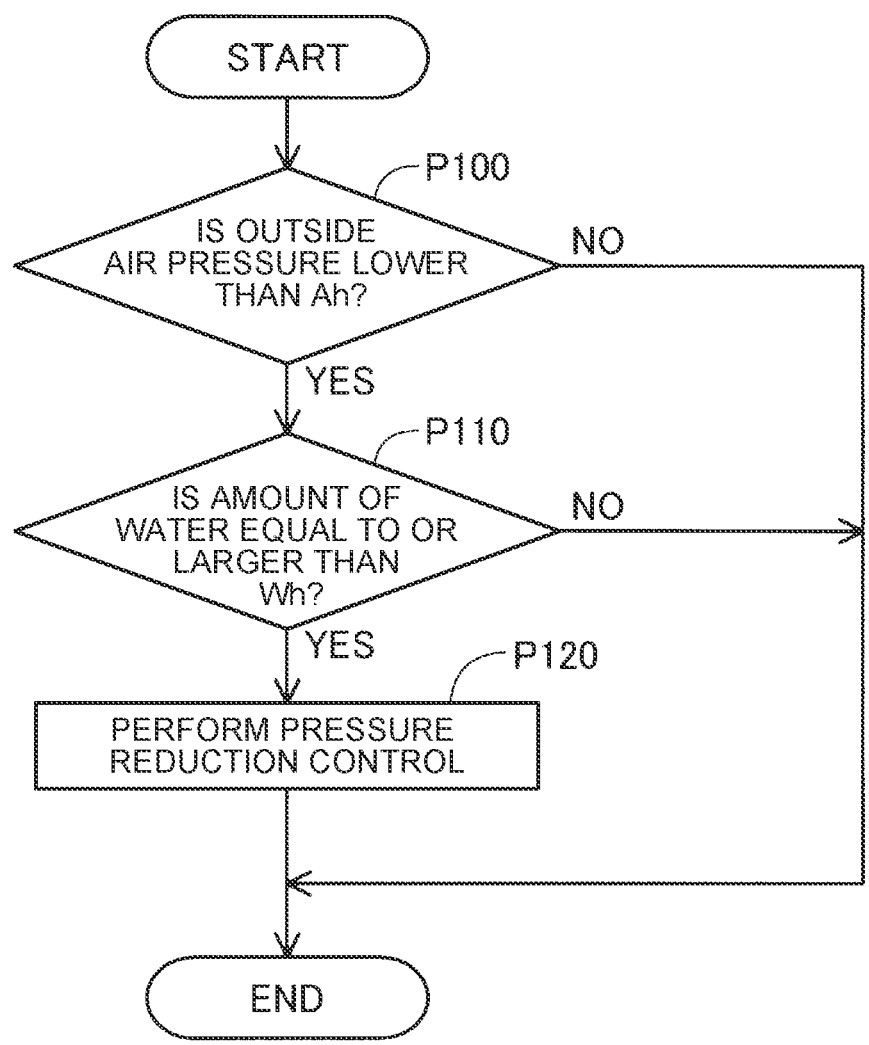
FIG. 4 is a flowchart for illustrating pressure reduction control.

FIG. 4 is a flowchart for illustrating pressure reduction control that is performed by the control unit 80. This process is constantly and repeatedly performed by the control unit 80 while the fuel cell system 110 is in operation.

First of all, the control unit 80 determines whether or not the outside air pressure is lower than an outside air pressure threshold Ah determined in advance (process P100). The control unit 80 is equipped with an outside air pressure acquisition unit 81 that acquires outside air pressure-associated information that is associated with the outside air pressure. In the present embodiment, the outside air pressure acquisition unit 81 acquires an outside air pressure measured by the outside air pressure gauge 41, as the outside air pressure-associated information that is associated with the outside air pressure, but the disclosure is not limited thereto. For example, the outside air pressure acquisition unit 81 may store in advance a lookup table that associates a position with the outside air pressure at the position, determine a position where the fuel cell system 110 exists from the GNSS information acquired from the GNSS receiver 84, and acquire an outside air pressure at the position through the use of this lookup table. In the present embodiment, the outside air pressure threshold Ah is equal to the standard atmospheric pressure (1 atm), but the disclosure is not limited thereto. For example, the outside air pressure threshold Ah may be equal to 0.9 atm or 0.8 atm. In other words, the outside air pressure threshold Ah is preferably equal to a value obtained by multiplying the standard atmospheric pressure by a coefficient equal to or smaller than 1, and this coefficient is preferably set to a value smaller than 1.

If it is determined that the outside air pressure is lower than the outside air pressure threshold Ah (YES in process P100), the control unit 80 determines whether or not the amount of water in the fuel cell 10 is equal to or larger than a water amount threshold Wh determined in advance (process P110). In the present embodiment, the water amount threshold Wh is an amount (L) corresponding to 30% of the volume in the fuel cell 10, but the disclosure is not limited thereto. For example, the water amount threshold Wh may be an amount (L) corresponding to 35% or 40% of the volume in the fuel cell 10.

The control unit 80 is equipped with a water amount acquisition unit 83 that acquires water amount-associated information that is associated with an amount of water in the fuel cell 10. In the present embodiment, the water amount acquisition unit 83 derives an amount of water in the fuel cell 10 from an impedance measured by the impedance measurement unit 93. In concrete terms, the control unit 80 stores in advance a lookup table that associates the value of a real part of the impedance with the amount of water in the fuel cell 10, and the amount of water in the fuel cell 10 is determined from this lookup table and the value of the real part of the measured impedance. Incidentally, the disclosure is not limited to this case. For example, a hygrometer may be provided in the cathode gas discharge flow passage 24, a value measured by this hygrometer may be adopted as water amount-associated information, and the amount of water in the fuel cell 10 may be determined from this measured value.

If it is determined that the amount of water in the fuel cell 10 is equal to or larger than the water amount threshold Wh (YES in process P110), the control unit 80 performs pressure reduction control (process P120). In concrete terms, the control unit 80 increases the flow rate of cathode gas supplied to the fuel cell 10 from the turbo compressor 42, by controlling the pressure adjusting valve 46 in such a manner as to reduce the pressure in the fuel cell 10, in comparison with the case where the pressure reduction condition is not fulfilled, when the pressure reduction condition is fulfilled. In the present embodiment, the control unit 80 performs pressure reduction control until the amount of water in the fuel cell 10 becomes smaller than the water amount threshold Wh, and then ends the flow. However, pressure reduction control may not necessarily be ended at this timing. For example, the control unit 80 may perform pressure reduction control until the amount of water in the fuel cell 10 becomes equal to or smaller than a lower limit water amount threshold smaller than the water amount threshold Wh (e.g., an amount (L) corresponding to 20% of the volume in the fuel cell 10), or may perform pressure reduction control until the output of the fuel cell 10 satisfies the required output.

In the present embodiment, the control unit 80 lowers the pressure in the fuel cell 10 as the outside air pressure falls in pressure reduction control.

Figure 5:
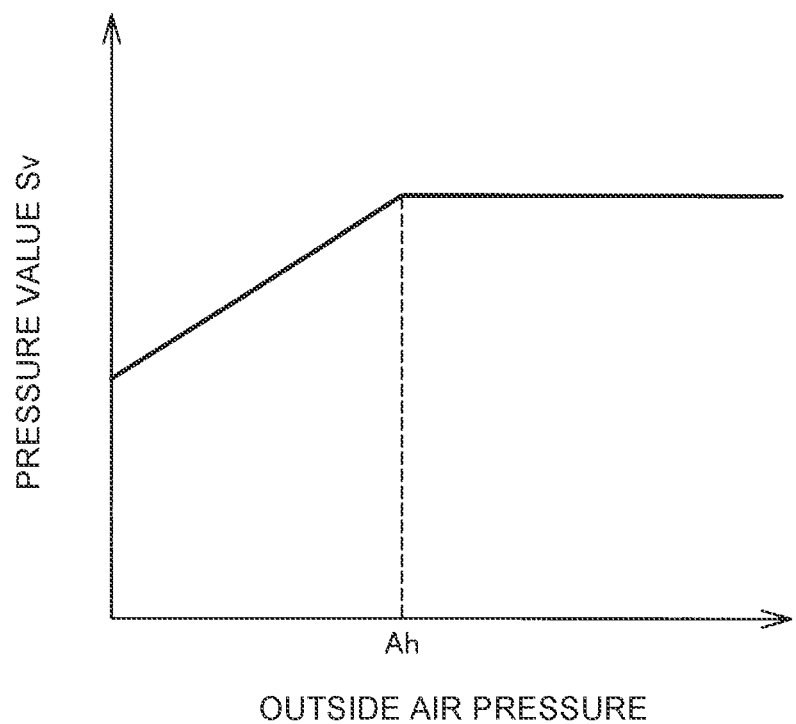
FIG. 5 is a view showing the outside air pressure and the value of the pressure in the fuel cell at the time of pressure reduction control.

FIG. 5 is a view showing the outside air pressure and a pressure value Sv in the fuel cell 10 at the time of pressure reduction control. In the case where the outside air pressure is lower than the outside air pressure threshold Ah, the pressure value Sv in the fuel cell 10 at the time of pressure reduction control falls as the outside air pressure falls. Therefore, the flow rate of cathode gas delivered to the fuel cell 10 can be effectively increased by performing pressure reduction control, but the disclosure is not limited thereto. For example, the pressure value in the fuel cell 10 at the time of pressure reduction control may be constant regardless of the outside air pressure.

On the other hand, if it is determined that the outside air pressure is equal to or higher than the outside air pressure threshold Ah (NO in process P100 (FIG. 4)) and that the amount of water in the fuel cell 10 is smaller than the water amount threshold Wh (NO in process P110), the control unit 80 ends the flow without performing pressure reduction control.

In the present embodiment, pressure reduction control is performed when the pressure reduction condition that the outside air pressure is lower than the outside air pressure threshold Ah and that the amount of water in the fuel cell 10 is equal to or larger than the water amount threshold Wh is fulfilled. Therefore, with the fuel cell system 110 according to the present embodiment, the flow rate of cathode gas delivered to the fuel cell 10 can be increased while maintaining the rotational speed of the turbo compressor 42, by lowering the pressure in the fuel cell 10 when the fuel cell system 110 is estimated to operate on the highland. As a result, the output of the fuel cell 10 can be enhanced. Incidentally, in the present embodiment, process P100 and process P110 are provided in this order, but the disclosure is not limited thereto. These processes may be permutated.

B. Second Embodiment

Figure 6:
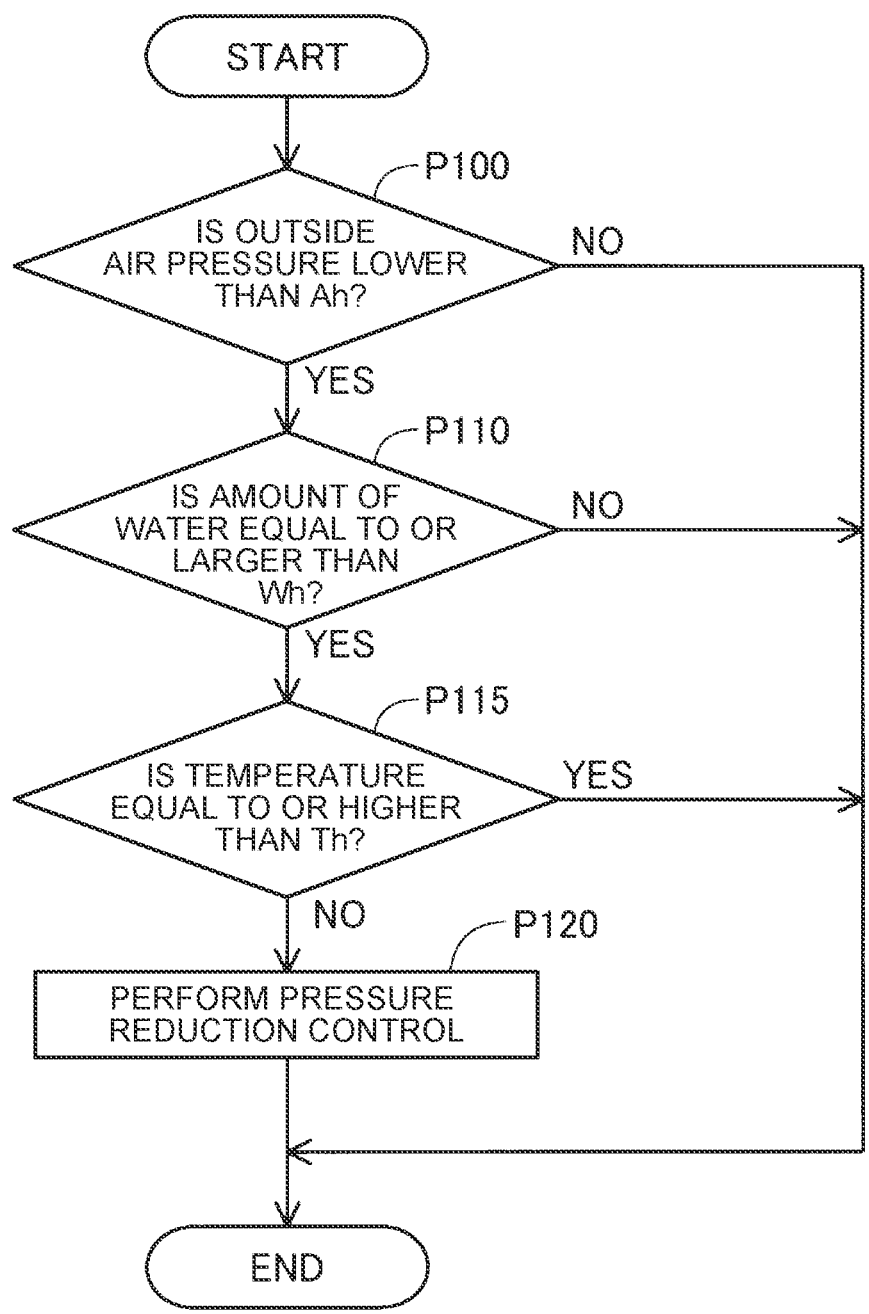
FIG. 6 is a flowchart in the second embodiment.

FIG. 6 is a flowchart in the second embodiment. The second embodiment is different from the first embodiment in that process P115 is provided between process P110 and process P120, but is identical thereto in the other details. Incidentally, in the present embodiment, process P100, process P110, and process P115 are provided in this order, but the disclosure is not limited thereto. These processes may be permutated.

In the second embodiment, if it is determined that the amount of water in the fuel cell 10 is equal to or larger than the water amount threshold Wh (YES in process P110), the control unit 80 determines whether or not the temperature of the fuel cell 10 is equal to or lower than a temperature threshold Th determined in advance (process P115). In the present embodiment, the temperature in the fuel cell 10 is measured by a temperature measurement unit 72 that is provided in the cooling flow passage 70 on an outlet side of the fuel cell 10. Incidentally, the temperature of the fuel cell 10 may not necessarily be measured according to this method. For example, it is possible to mention a method according to which a temperature gauge is provided at a cathode outlet or an anode outlet of the fuel cell 10 and the temperature in the fuel cell 10 is measured through the use of this temperature gauge. Besides, in the present embodiment, the temperature threshold Th is equal to 90° C., but the disclosure is not limited thereto. For example, the temperature threshold Th may be equal to 80° C. or 95° C.

If it is determined that the temperature of the fuel cell 10 is equal to or higher than the temperature threshold Th (YES in process P115), the control unit 80 ends the flow without performing pressure reduction control. On the other hand, if it is determined that the temperature of the fuel cell 10 is lower than the temperature threshold Th (NO in process P115), the control unit 80 performs pressure reduction control (process P120), and ends the flow.

In general, when the temperature of the fuel cell 10 is high, the water vapor pressure in the fuel cell 10 is higher than when the temperature of the fuel cell 10 is low. Therefore, when pressure reduction control is performed, the amount of water in the fuel cell 10 may decrease rapidly. According to the second embodiment, however, pressure reduction control is not performed when the temperature of the fuel cell 10 is equal to or higher than the temperature threshold Th. Therefore, the interior of the fuel cell 10 can be restrained from drying rapidly.

C. Third Embodiment

Figure 7:
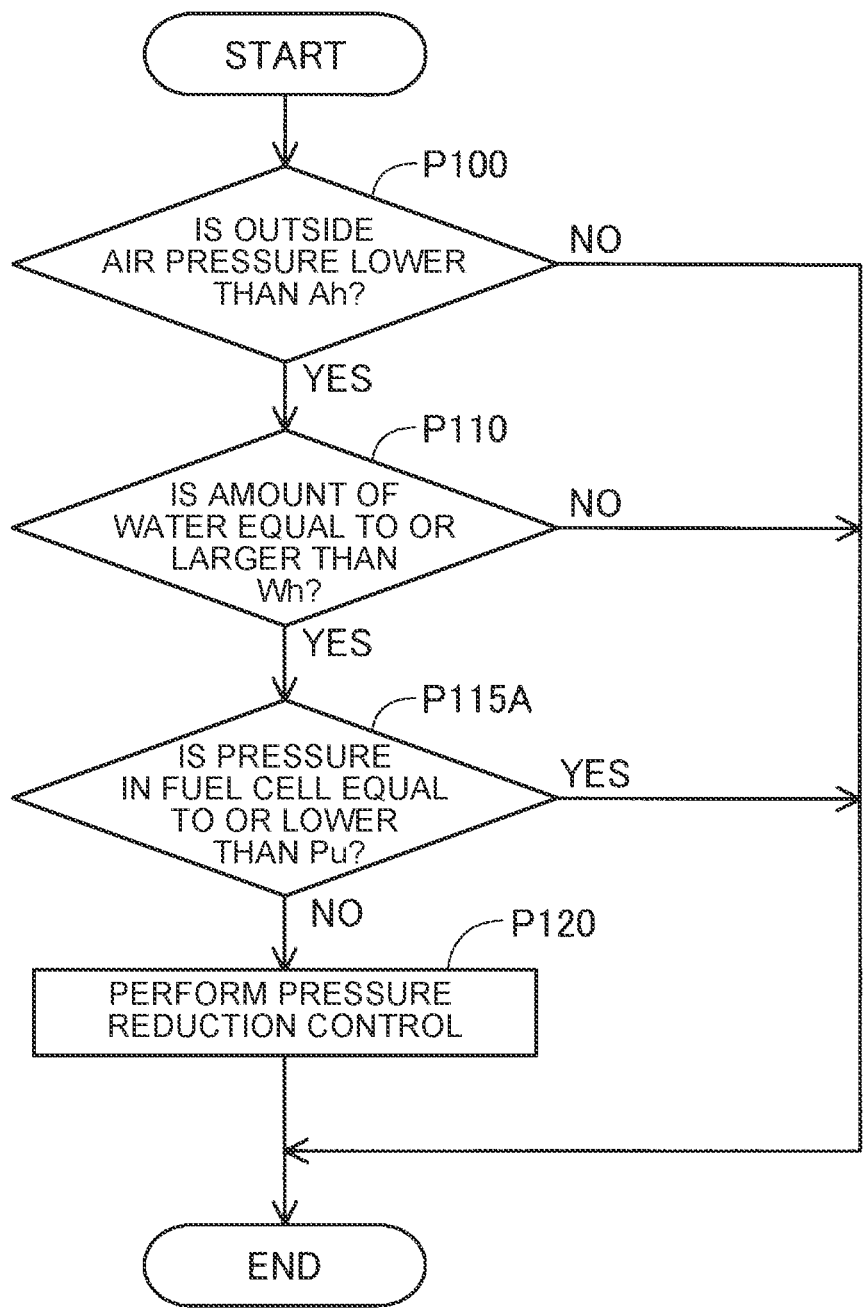
FIG. 7 is a flowchart in the third embodiment.

FIG. 7 is a flowchart in the third embodiment. The third embodiment is different from the second embodiment in that process P115A is provided instead of process P115, but is identical thereto in the other details. Incidentally, in the present embodiment, process P100, process P110, and process P115A are provided in this order, but the disclosure is not limited thereto. These processes may be permutated.

In the third embodiment, if it is determined that the amount of water in the fuel cell 10 is equal to or larger than the water amount threshold Wh (YES in process P110), the control unit 80 determines whether or not the pressure in the fuel cell 10 is equal to or lower than a pressure upper limit value Pu (process P115A). The pressure in the fuel cell 10 is measured by a first pressure measurement unit that is provided in the fuel cell system 110.

If it is determined that the pressure in the fuel cell 10 is equal to or lower than the pressure upper limit value Pu (YES in P115A), the control unit 80 ends the flow without performing pressure reduction control. On the other hand, if it is determined that the pressure in the fuel cell 10 is higher than the pressure upper limit value Pu (NO in process P115A), the control unit 80 performs pressure reduction control (process P120), and ends the flow. In this manner, the performance of unnecessary control is avoided.

Figure 8:
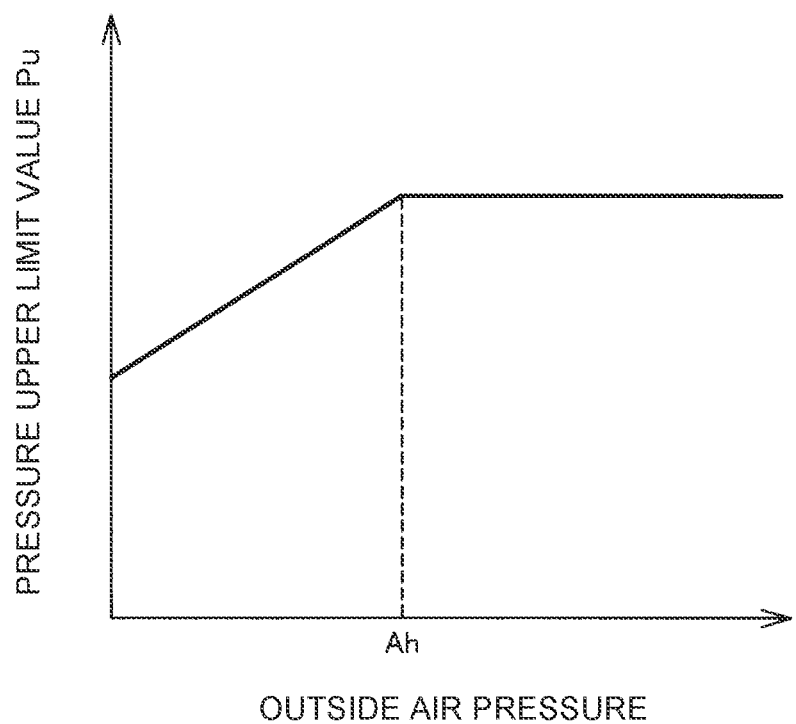
FIG. 8 is a view showing a relationship between the outside air pressure and the pressure upper limit value.

FIG. 8 is a view showing a relationship between the outside air pressure and the pressure upper limit value Pu. In the present embodiment, in the case where the outside air pressure is lower than the outside air pressure threshold Ah, the pressure upper limit value Pu in the fuel cell 10 at the time of pressure reduction control falls as the outside air pressure falls. Therefore, pressure reduction control can be performed only in case of necessity, but the disclosure is not limited thereto. For example, the pressure upper limit value Pu in the fuel cell 10 at the time of pressure reduction control may be constant regardless of the outside air pressure.

The disclosure is not limited to the above-mentioned embodiments, but can be realized in various configurations within such a range as not to depart from the gist thereof. For example, the technical features in the embodiments corresponding to the technical features in the respective modes described in the section of the summary of the disclosure can be appropriately replaced or combined with one another to entirely or partially solve the above-mentioned problem or to entirely or partially achieve the above-mentioned effect. Besides, the technical features can be appropriately eliminated unless they are described as being indispensable in the present specification.

What is claimed is:

1. A fuel cell system comprising:
a fuel cell that is configured to generate electric power through an electrochemical reaction between anode gas and cathode gas;
a cathode gas supply flow passage that is configured to supply the cathode gas to the fuel cell;
a cathode gas discharge flow passage that is configured to discharge the cathode gas from the fuel cell;
a turbo compressor that is provided in the cathode gas supply flow passage;
a pressure adjusting valve that is provided in the cathode gas discharge flow passage;
an outside air pressure acquisition unit that is configured to acquire outside air pressure-associated information that is associated with an outside air pressure;
a water amount acquisition unit that is configured to acquire water amount-associated information that is associated with an amount of water in the fuel cell; and
a control unit that is configured to perform pressure reduction control for increasing a flow rate of the cathode gas supplied to the fuel cell from the turbo compressor, by controlling the pressure adjusting valve such that a pressure in the fuel cell is lower when a pressure reduction condition is fulfilled than when the pressure reduction condition is not fulfilled, the pressure reduction condition being a condition that the outside air pressure determined based on the outside air pressure-associated information is lower than an outside air pressure threshold determined in advance and that the amount of water determined based on the water amount-associated information is equal to or larger than a water amount threshold determined in advance.

2. The fuel cell system according to claim 1, wherein the control unit is configured to reduce the pressure in the fuel cell as the outside air pressure falls in the pressure reduction control.

3. The fuel cell system according to claim 1, further comprising:
a temperature measurement unit that is configured to measure a temperature of the fuel cell, wherein
the control unit is configured to refrain from performing the pressure reduction control when the temperature is equal to or higher than a temperature threshold determined in advance.

4. The fuel cell system according to claim 3, wherein the control unit is configured to perform the pressure reduction control when the temperature is lower than the temperature threshold determined in advance.

5. The fuel cell system according to claim 1, further comprising:
a first pressure measurement unit that is configured to measure the pressure in the fuel cell, wherein
the control unit is configured to perform the pressure reduction control when the pressure is higher than a pressure upper limit value determined in advance.

6. A method of controlling the fuel cell system according to claim 1, comprising:
performing pressure reduction control for increasing a flow rate of the cathode gas supplied to the fuel cell from the turbo compressor, by controlling the pressure adjusting valve such that a pressure in the fuel cell is lower when a pressure reduction condition is fulfilled than when the pressure reduction condition is not fulfilled, the pressure reduction condition being a condition that an outside air pressure is lower than an outside air pressure threshold determined in advance and that an amount of water in the fuel cell is equal to or larger than a water amount threshold determined in advance.

7. The fuel cell system according to claim 5, wherein the control unit is configured to reduce the pressure upper limit value when the outside air pressure is lower than the outside air pressure threshold.

* * * * *